US011001514B2

(12) United States Patent
Witham et al.

(10) Patent No.: US 11,001,514 B2
(45) Date of Patent: May 11, 2021

(54) METHOD OF TREATING HIGH-SOLIDS MINERAL SLURRIES WITH POLYMERIC FLOCCULANTS

(71) Applicant: Dow Global Technologies LLC, Midland, MI (US)

(72) Inventors: Cole A. Witham, Pearland, TX (US); Paul A. Gillis, Lake Jackson, TX (US); Michael K. Poindexter, Sugar Land, TX (US); Jason S. Moore, Walnut Creek, CA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/096,108

(22) PCT Filed: May 22, 2017

(86) PCT No.: PCT/US2017/033758
§ 371 (c)(1),
(2) Date: Oct. 24, 2018

(87) PCT Pub. No.: WO2017/205249
PCT Pub. Date: Nov. 30, 2017

(65) Prior Publication Data
US 2019/0152814 A1 May 23, 2019

Related U.S. Application Data

(60) Provisional application No. 62/342,275, filed on May 27, 2016.

(51) Int. Cl.
| C02F 1/56 | (2006.01) |
| B01D 21/01 | (2006.01) |
| C10G 1/04 | (2006.01) |
| E21B 21/06 | (2006.01) |
| C02F 11/14 | (2019.01) |
| C02F 11/147 | (2019.01) |
| C02F 11/121 | (2019.01) |
| E21B 43/34 | (2006.01) |
| C02F 103/10 | (2006.01) |
| C02F 103/12 | (2006.01) |
| C02F 103/16 | (2006.01) |

(52) U.S. Cl.
CPC ............ C02F 1/56 (2013.01); B01D 21/01 (2013.01); C02F 11/121 (2013.01); C02F 11/14 (2013.01); C02F 11/147 (2019.01); C10G 1/04 (2013.01); E21B 21/068 (2013.01); *C02F 2103/10* (2013.01); *C02F 2103/12* (2013.01); *C02F 2103/16* (2013.01); *E21B 21/065* (2013.01); *E21B 43/34* (2013.01)

(58) Field of Classification Search
None
See application file for complete search history.

(56) References Cited

U.S. PATENT DOCUMENTS

| 2,969,402 | A | 1/1961 | Hill et al. |
| 3,037,943 | A | 6/1962 | Hill et al. |
| 3,627,702 | A | 12/1971 | Gehm et al. |
| 3,723,310 | A * | 3/1973 | Lang et al. ............ B01D 21/01 210/727 |
| 4,193,892 | A | 3/1980 | Goeke et al. |
| 4,267,309 | A | 5/1981 | Goeke et al. |
| 4,342,653 | A | 8/1982 | Halverson |
| 4,667,013 | A | 5/1987 | Reichle |
| 4,678,585 | A | 7/1987 | Brownrigg |
| 4,704,209 | A | 11/1987 | Richardson et al. |
| 4,931,190 | A | 6/1990 | Laros |
| 5,104,551 | A | 4/1992 | David et al. |
| 5,858,214 | A | 1/1999 | Yap |
| 6,383,282 | B1 | 5/2002 | Chaiko |
| 7,618,541 | B2 | 11/2009 | Feng |
| 7,901,583 | B2 | 3/2011 | McColl et al. |
| 2012/0160776 | A1 | 6/2012 | Franks et al. |
| 2013/0043165 | A1* | 2/2013 | Revington ............ B01F 5/0463 208/188 |
| 2014/0158633 | A1* | 6/2014 | Holt .......................... C02F 1/56 210/728 |
| 2015/0053623 | A1 | 2/2015 | Holt et al. |
| 2015/0144572 | A1 | 5/2015 | Holt |

FOREIGN PATENT DOCUMENTS

| CA | 287177 | 2/1929 |
| GB | 2416537 | 2/2006 |
| WO | 2011070218 | 6/2011 |
| WO | 2013116027 | 8/2013 |
| WO | 2015168376 | 11/2015 |

OTHER PUBLICATIONS

Van De Ven, T., "Association-Induced Polymer Bridging by Poly-(ethylene oxide)-Cofactor Flocculation Systems," Adv. Coll. Interface Sci., 2005, p. 114-115, v. 147.
Gaudreault, R., et. al., "Mechanism of Flocculation with Poly(ethylene Oxide) and Novel Cofactors", Colloid Surf. A Physiochem. Eng. Aspects, 2005, v. 131.
Wu, M., et. al., "Flocculation of Papermaking Fines by Poly(ethylene oxide) and Various Cofactors: Effects of PEO Entanglement, Salt and Fine Properties" Colloids Surf. A Physiochem. Eng. Aspects, 2007, v. 211.
Li, et. al., "Synergetic Role of Polymer Flocculant in Low-Temperature Bitumen Extraction and Tailings Treatment," Energy and Fuels, 2005, p. 936-943, v. 19.

(Continued)

*Primary Examiner* — Clare M Perrin

(57) ABSTRACT

The present invention relates to a method of dewatering an aqueous mineral suspension comprising introducing into the suspension a flocculating system comprising a mixture of polyethylene oxide polymers, in particular a mixture of one or more high molecular weight polyethylene oxide polymer and one or more ultra high molecular weight polyethylene oxide polymer. Said mixture of polyethylene oxide polymers is useful for the treatment of suspensions of particulate material, especially waste mineral slurries. The invention is particularly suitable for the treatment of tailings and other waste material resulting from mineral processing, in particular, the processing of oil sands tailings.

1 Claim, No Drawings

(56) References Cited

OTHER PUBLICATIONS

Wang, X., et. al., "Polymer Aids for Settling and Filtration of Oil Sands Tailings", Can. J. Chem. Eng., 2010, p. 403-410, v. 88.

Gong, et. al., "Reducing quartz gangue entrainment in sulphide ore flotation by high molecular weight polyethylene oxide," International Journal of Mineral Processing, 2010, p. 44-51, v. 97, No. 1-4.

Bersa, L., et. al., "Studies on flocculation and dewatering of kaolin suspensions by anionic polyacrylamide flocculant in the presence of some surfactants," International Journal of Mineral Processing, 2002, v. 66.

Mohler, C., et. al., Development of Flocculants for Oil Sands Tailings Using High Throughput Techniques, International Oil Sands Tailings Conference, 2012, Edmonton, AB.

\* cited by examiner

METHOD OF TREATING HIGH-SOLIDS MINERAL SLURRIES WITH POLYMERIC FLOCCULANTS

FIELD OF THE INVENTION

The present invention relates to polymeric flocculants, specifically polyethylene oxide polymers and use thereof for the treatment of suspensions of particulate material, especially waste mineral slurries. The invention is particularly suitable for the treatment of tailings and other waste material resulting from mineral processing, in particular, processing of oil sands tailings.

BACKGROUND OF THE INVENTION

Processes that treat mineral ores in order to extract mineral values including in some cases the recovery of hydrocarbons will normally result in waste material. Often the waste material consists of an aqueous slurry or sludge comprising particulate mineral material, for instance clay, shale, sand, grit, metal oxides, etc. admixed with water and possibly residual hydrocarbons.

In some cases the waste material such as mine tailings can be conveniently disposed of in an underground mine to form backfill. For other applications it may not be possible to dispose of the waste in a mine. In these instances, it is common practice to dispose of this material by pumping the aqueous slurry to open mines, pits, lagoons, heaps or stacks and allowing it to dewater gradually through the actions of sedimentation, drainage, evaporation, and consolidation.

There is a great deal of environmental pressure to minimize the allocation of new land for disposal purposes and to more effectively use the existing waste areas. Generally, the goal of oil sands tailings remediation is to recover water to be reused in the process and obtain solids that are dry enough so as to be trafficable so that the dried tailings/solids can be used to reclaim land. The exact requirements needed for final land reclamation and restoration will often be governed by regional or national mandates.

One method is to load multiple layers of waste onto an area to thus form higher stacks of waste. However, this presents a difficulty of ensuring that the waste material can only flow over the surface of previously consolidated waste within acceptable boundaries, is allowed to rigidify to form a stack, and that the waste is sufficiently consolidated to support multiple layers of consolidated material, without the risk of collapse or slip. Thus the requirements for providing a waste material with the right sort of characteristics for stacking is altogether different from those required for other forms of disposal, such as back-filling within a relatively enclosed area.

In a typical mineral processing operation, waste solids are separated from materials that contain mineral values in an aqueous process. The mined material may also encompass the recovery of hydrocarbons. The aqueous suspension of waste solids often contains clays and other minerals, and is usually referred to as tailings. This is true in a variety of mineral solids including tailings from oil sands. These solids can be concentrated by a flocculation process in a thickener to give a higher density underflow and to recover some of the process water. It is usual to pump the underflow to a surface holding area, often referred to as a tailings pit or dam. Other ways to treat the flocculated solids include, for example, thin-lift which involves depositing on a sloped surface with dewatering and evaporation, deep-pit, filter presses, belt presses, or centrifuges.

Once deposited at this surface holding area, water will continue to be released from the aqueous suspension resulting in further concentration of the solids over a period of time. Once a sufficient volume of water has been collected this is usually pumped back to the mineral processing plant. Once the solids content is high enough in the dewatered solids, land reclamation becomes possible.

Sometimes the solids content is not high enough after a first treatment and tailings may need to be retreated to further increase its solid content.

Flocculants are also used to treat legacy tailings, sometimes referred to as mature fine tailings (MFT), such as those collected and concentrated in ponds.

The prior art contains numerous references to flocculation processes and various proposed flocculating agents, for example see U.S. Pat. No. 7,901,583.

Polymeric flocculants include polymers of sodium acrylate, for example see U.S. Pat. No. 4,342,653 and sulfonate polymers, for example see U.S. Pat. No. 4,704,209.

Polymers of acrylamide are commonly employed as flocculating agents. However, acrylamides suffer from various disadvantages, for instance, rapid hydrolyzation in alkaline solutions which makes them impractical for use in various applications that involve alkaline solutions, sensitivity to treatment dosage levels which makes it easy to under or overdose, floc shear instability, and/or floc structures which do not allow for complete dewatering.

U.S. Pat. No. 4,678,585 describes flocculating red mud suspensions in the Bayer alumina process using homopolymers of acrylic acid or sodium acrylate or polymers of acrylic acid or acrylate with acrylamide.

Li, et al., Energy & Fuels, 2005, vol. 19, pp. 936-943 disclose the effect of a hydrolyzed polyacrylamide (HPAM) on bitumen extraction and tailings treatment of oil sands ores. Careful control of HPAM dosage is necessary to achieve efficiency in both bitumen extraction and in flocculation of solid fines.

Polymers of polyethylene oxide are commonly employed as flocculating agents, for example see U.S. Pat. Nos. 4,931,190; 5,104,551; 6,383,282; and WO 2011070218. US Publication No. 20120160776 discloses stimulant-sensitive flocculation using a polyethylene oxide/polypropylene block copolymer.

In spite of the numerous polymeric flocculating agents, there is still a need for a flocculating agent to further improve consolidation of suspensions of materials as well as further improve upon the dewatering of suspensions of waste solids that have been transferred as a fluid or slurry to a settling area for disposal. In particular, it would be desirable to provide a more effective treatment of waste suspensions, such as oil sands tailings, transferred to disposal areas ensuring fast, efficient concentration, and more environmentally friendly storage of solids and improved clarity of released water.

BRIEF SUMMARY OF THE INVENTION

The present invention is a method for dewatering an aqueous suspension of particulate material comprising the steps of: a) adding to the aqueous suspension a mixture comprising, consisting essentially of, or consisting of (i) one or more high molecular weight polyethylene oxide polymer (PEO) having a molecular weight from 100,000 to 5,000,000 g/mol, preferably from 1,000,000 to 4,000,000 g/mol and (ii) one or more ultra high molecular weight polyethylene oxide polymer (PEO) having a molecular weight from 4,000,000 to 10,000,000 g/mol, preferably from 8,000,000 to 10,000,000 g/mol, with the proviso that the ultra high molecular weight PEO has a molecular weight at least 1.5 times greater than the molecular weight of the high molecular weight PEO, more preferably 2 times; b) allowing the suspension to flocculate; and c) dewatering the suspension, preferably the mixture of polyethylene oxide polymers is added as an aqueous mixture.

In one embodiment of the method disclosed herein above, the aqueous suspension of particulate material comprises tailings and other waste material resulting from the mineral processing of phosphate, diamond, gold, mineral sands, zinc, lead, copper, silver, uranium, nickel, iron ore, coal, oil sands, or red mud.

In one embodiment of the method disclosed herein above, the aqueous suspension of particulate material comprises tailings and other waste material resulting from the mineral processing of oil sands.

DETAILED DESCRIPTION OF THE INVENTION

Recently, it has been discovered that synergistic flocculant properties can be obtained from a mixture of a high molecular weight polyethylene oxide polymer (PEO) and an ultra high molecular weight PEO. According to the present invention, we provide a method of dewatering an aqueous suspension of particulate material comprising introducing into the suspension a flocculating system comprising a mixture of polyethylene oxide-based polymers, preferably a mixture comprising, consisting essentially of, or consisting of (i) one or more high molecular weight PEO having a molecular weight from 100,000 to 5,000,000 g/mol and (ii) one or more ultra high molecular weight PEO having a molecular weight from greater than 4,000,000 to 10,000,000 g/mol with the proviso that the ultra high molecular weight PEO has a molecular weight at least 1.5 times greater than the molecular weight of the high molecular weight PEO, more preferably 2 times greater than the molecular weight of the high molecular weight PEO.

The mixture of polyethylene oxide polymers of the present invention may be applied to an aqueous suspension of the particulate mineral material as it is transferred as a fluid to the deposition area, an intermediate treatment area and/or once it has been transferred to the deposition area. By deposition area we mean any area where the aforementioned particulate material can be deposited. This can for instance be any area where waste is deposited from a mineral processing operation. Alternatively, it may be any area that has been excavated, for instance to extract useful material e.g., mineral values including bitumen and in which the excavated area is filled with particulate material treated according to the invention.

Suspended solids may be concentrated in a thickener and this material will for instance leave the thickener as an underflow which will be pumped along a conduit to a deposition area. The conduit can be any convenient means for transferring the material to the deposition area and may for instance be a pipe or a trench. The material remains fluid and pumpable during the transfer stage until the material is allowed to stand. Other means of treatment include the use of thin-lift deposition, deep pits, filter presses, belt presses and/or centrifuges.

In one embodiment, the process of the invention is part of the mineral processing operation in which an aqueous suspension of waste solids is optionally flocculated in a vessel to form a supernatant layer comprising an aqueous liquor and an underflow layer comprising thickened solids which form the material. The supernatant layer will be separated from the under flow in the vessel and typically recycled or subjected to further processing. The aqueous suspension of waste solids or optionally, the thickened underflow is transferred, usually by pumping, to a deposition area, which may for instance be a tailings pit, dam, basin, or pond.

The material may consist of only mainly fine particles, or a mixture of fine and coarse particles. Once the material has reached the deposition area it is allowed to settle and dewater and in addition preferably consolidation takes place. The mixture of polyethylene oxide polymers may be added to the material in an effective amount at any convenient point, typically during transfer. In some cases the aqueous suspension may be transferred first to a holding vessel before being transferred to the deposition area. After deposition of the suspension of particulate mineral material it will dewater to form a dewatered solid. Preferably the dewatered suspension of particulate mineral material will form a compact and dry solid mass through the combined actions of sedimentation, drainage, evaporative drying, and consolidation.

The deposited particulate mineral material will reach a substantially dry state. In addition the particulate mineral material will typically be suitably consolidated and firm e.g., due to simultaneous settling and dewatering to enable the land to bear significant weight.

Suitable doses of the mixture of polyethylene oxide polymers range from 10 grams to 10,000 grams per ton of material solids. Generally the appropriate dose can vary according to the particular material and material solids content. Preferred doses are in the range 30 to 7,500 grams per ton, more preferably 50 to 3,000 grams per ton, while even more preferred doses are in the range from 100 to 2,000 grams per ton. The mixture of polyethylene oxide polymers may be added to the suspension of particulate mineral material, e.g., the tailings slurry, in solid particulate form, an aqueous solution that has been prepared by dissolving the mixture of polyethylene oxide polymers into water or an aqueous-based medium, or a suspended slurry in a solvent.

The mineral material particles are usually inorganic. Typically the material may be derived from or contain filter cake, tailings, thickener underflows, or unthickened plant waste streams, for instance other mineral tailings, slurries, or slimes, including phosphate, diamond, gold slimes, mineral sands, tailings from zinc, lead, copper, silver, uranium, nickel, iron ore processing, coal, oil sands or red mud. The material may be solids settled from the final thickener or wash stage of a mineral processing operation. Thus the material desirably results from a mineral processing operation. Preferably the material comprises tailings. Preferably the mineral material would be hydrophilic and/or bi-wettable in nature and more preferably selected from red mud and tailings containing hydrophilic clay, such as oil sands tailings, etc.

The fine tailings or other material which is pumped may have a solids content in the range 5 percent to 80 percent by weight. The slurries are often in the range 15 percent to 70 percent by weight, for instance 25 percent to 40 percent by weight. The fine tailings and coarse tailings may be present or combined together in any convenient ratio provided that the material remains pumpable.

The dispersed particulate solids may have a unimodal, bimodal, or multimodal distribution of particle sizes. The distribution will generally have a fine fraction and a coarse fraction, in which the fine fraction peak is substantially less than 45 microns and the coarse (or non-fine) fraction peak is substantially greater than 45 microns.

We have found better results are obtained in terms of dewatering and consolidation when the material is relatively concentrated and homogenous. It may also be desirable to combine the addition of the mixture of polyethylene oxide polymers with other additives. For instance, the flow properties of the material through a conduit may be facilitated by including an inorganic or organic coagulant. Typically where a coagulant is included it would be included in conventional amounts. We have found that surprisingly the presence of coagulants or other additives does not impair the dewatering, and consolidation of the material or indeed the rehabilitation of the area into which it is deposited.

In one embodiment, the mixture of polyethylene oxide polymers of the present invention may be used in conjunction with other types of flocculants (e.g. polyacrylates, polyacrylamides, partially-hydrolyzed polyacrylamides, etc.). The combinations of treatment chemicals can involve sequential additions or simultaneous addition to the slurry in need of treatment.

Typically the suspension of particulate mineral material may be transferred along a conduit and through an outlet to the deposition area. The suspension of particulate mineral material will then be allowed to dewater at the deposition area. Preferably the suspension of particulate material that has been transferred to the deposition area will also consolidate upon standing. In many cases the deposition area will already contain consolidated mineral material. Suitably the suspension of particulate mineral material upon reaching the deposition area will flow on the surface of previously consolidated mineral material and the material will be allowed to stand and consolidate to form a stack.

Preferably the material will be pumped as a fluid to the deposition area and the material allowed to flow over the surface of consolidated material. The material is allowed to stand and consolidate and therefore forming a stack of consolidated material. This process may be repeated several times to form a stack that comprises several layers of consolidated material. The formation of stacks of consolidated material has the advantage that less area is required for disposal.

In a mineral processing operation where a suspension containing solids is flocculated in a thickener in order to separate the suspension into a supernatant layer and an underflow material, the material can typically be treated at any suitable point before treatment in a thickener and/or after flocculation in the thickener but before the material is allowed to stand. Typically the suspension is transferred along a conduit to a deposition area. This is normally achieved by pumping the suspension of particulate mineral material. A suitable and effective dewatering amount of the polymers can be mixed with the material prior to or during a pumping stage. In this way the polymers can be distributed throughout the material.

Alternatively, the mixture of polyethylene oxide polymers can be introduced and mixed with the material subsequently to a pumping stage. The most effective point of addition will depend upon the substrate and the distance from the thickener to the deposition area. If the conduit is relatively short it may be advantageous to dose the polymer mixture solution close to where the material flows from the thickener. On the other hand, where the deposition area is significantly remote from the thickener it may be desirable to introduce the polymer mixture solution closer to the outlet. In some instances it may be convenient to introduce the polymer mixture of the present invention into the material as it exits the outlet. Frequently it may be desirable to add the mixture of polyethylene oxide polymers to the suspension before it exits the outlet, preferably within 10 meters of the outlet. For slurries taken from a tailings pond, treatment can be made via in-line addition of flocculant to the flowing slurry. The treated material can then be sent to a pit, sloped surface or further treated in a filter press, belt press or centrifuge before placement in a disposal area.

The rheological characteristics of the material as it flows through the conduit to the deposition area is important, since any significant reduction in flow characteristics could seriously impair the efficiency of the process. It is important that there is no significant settling of the solids as this could result in a blockage, which may mean that the plant has to be closed to allow the blockage to be cleared. In addition it is important that there is no significant reduction in flow characteristics, since this could drastically impair the pumpability of the material. Such a deleterious effect could result in significantly increased energy costs as pumping becomes harder and the likelihood of increased wear on the pumping equipment.

The rheological characteristics of the suspension of particulate mineral material as it dewaters is important, since once the material is allowed to stand it is important that flow is minimized and that ideally solidification and preferably consolidation of the material proceeds at a steady if not rapid pace. If the material is too fluid then it will not form an effective stack and there is also a risk that it will contaminate water released from the material. It is also desirable that the consolidated material is sufficiently strong to remain intact and withstand the weight of subsequent layers of consolidated material being applied to it.

In one embodiment the process of the present invention will achieve a heaped disposal geometry via a deep deposit and will co-immobilize the treated fine and course fractions of the solids in the material. The heaped geometry appears to give a higher downward compaction pressure on underlying solids which seems to be responsible for enhancing the rate of dewatering. We find that this geometry results in a greater amount of waste per surface area, which is both environmentally and economically beneficial.

A preferred feature of the present invention is the consolidation during the release of aqueous liquor that preferably occurs during the dewatering step. Thus in a preferred form of the invention the material is dewatered during consolidation to release liquor containing significantly less solids. The liquor can then be returned to the process thus reducing the volume of imported water required and therefore it is important that the liquor is clear and substantially free of contaminants, especially migrating particulate fines. Suitably, the liquor may for instance be recycled to the thickener from which the material is separated as an underflow.

High molecular weight polyethylene oxide polymers and methods to make said polymers are known, for example see WO 2013116027. In one embodiment of the present invention, a zinc catalyst, such as disclosed in U.S. Pat. No. 4,667,013, can be employed to make the polyethylene oxide polymers of the present invention. In a preferred embodiment the catalyst used to make the polyethylene oxide polymers of the present invention is a calcium catalyst such as those disclosed in U.S. Pat. Nos. 2,969,402; 3,037,943; 3,627,702; 4,193,892; and 4,267,309, all of which are incorporated by reference herein in their entirety. Polyethylene oxide (PEO) refers to an oligomer or polymer of ethylene oxide represented by the formula $H-(O-CH_2-CH_2)_n-OH$, where n refers to the number of repeat units in the polymer. Typically, n for high molecular weight variations of this polyethylene oxide (PEO) is large and is in the range of from 2,000 to 113,600. For example, when n is equal to 10,000 the high molecular weight PEO has a molecular weight of about 440,000 g/mol. In general, the average molecular weight of the high molecular weight polyethylene oxide (PEO) is from 100,000 g/mol to 5,000,000 g/mol. Preferably the average molecular weight of high molecular weight PEO is equal to or greater than 100,000 g/mol, in other embodiments it is equal to or greater than 200,000 g/mol, in other embodiments it is equal to or greater than 400,000 g/mol, in another embodiments it is equal to or greater than 600,000 g/mol, and in another embodiments it is equal to or greater than 800,000 g/mol. In general, the average molecular weight of the high molecular weight PEO is equal to or less than 5,000,000 g/mol, in another embodiment it is equal to or less than 4,000,000 g/mol, in another embodiment it is equal to or less than 3,000,000 g/mol, in another embodiment it is equal to or less than 2,000,000 g/mol, and in an additional embodiment it is equal to or less than 1,000,000 g/mol.

Typically, n for ultra high molecular weight variations of this polyethylene oxide (PEO) is large and is in the range of from greater than 91,000 to 350,000. For example, when n is equal to 200,000 the high molecular weight PEO has a molecular weight of 8,800,000 g/mol. In general, the average molecular weight of the high molecular weight polyethylene oxide (PEO) is equal to or greater than 4,000,000 g/mol to 15,000,000 g/mol. Preferably the average molecular weight of the ultra high molecular weight PEO is equal to or greater than 4,000,000 g/mol, in another embodiment it is equal to or greater than 5,000,000 g/mol, another embodiment it is equal to or greater than 6,000,000 g/mol, another embodiment it is equal to or greater than 7,000,000 g/mol, and in an additional embodiment it is equal to or greater than 8,000,000 g/mol. In general, the average molecular weight of the ultra high molecular weight PEO is equal to or less than 15,000,000 g/mol, in another embodiment it is equal to or less than 12,000,000 g/mol, in another embodiment it is equal to or less than 10,000,000 g/mol, and in additional embodiments it is equal to or less than 9,000,000 g/mol.

A person of ordinary skill in the art will recognize that additional ranges of the high and ultra high molecular weight PEO within the explicit ranges above are contemplated and are within the present disclosure. Suitable commercial ultra high molecular weight PEO are available from The Dow Chemical, for example, POLYOX™ WSR N-10, N-80, N-750, N-3000, 205, 1105, N-12K, N-60K, 301, Coagulant, 303, and 308 or UCARFLOC™ 300, 302, 304, 309, and 310.

The amount of the high molecular weight PEO component (i) in the polyethylene oxide mixture of the present invention is present in an amount from 1 weight percent to 99 weight percent and the amount of the ultra high molecular weight PEO component (ii) in the polyethylene oxide mixture of the present invention is present in the amount from 99 weight percent to 1 weight percent.

The amount of the high molecular weight PEO component (i) in the polyethylene oxide mixture of the present invention is present in an amount equal to or greater than 1 weight percent and equal to or less than 99 weight percent, preferably equal to or less than 95 weight percent, preferably equal to or less than 90 weight percent, more preferably equal to or less than 80 weight percent, more preferably equal to or less than 70 weight percent, more preferably equal to or less than 60 weight percent, more preferably equal to or less than 50 weight percent, more preferably equal to or less than 40 weight percent, more preferably equal to or less than 30 weight percent, more preferably equal to or less than 20 weight percent, more preferably equal to or less than 10 weight percent, and more preferably equal to or less than 5 weight percent based on the combined weight of the mixture of the high and ultra high molecular weight PEOs.

The amount of the ultra high molecular weight PEO component (ii) in the polyethylene oxide mixture of the present invention is present in an amount equal to or less than 99 weight percent and present in an amount equal to or greater than 1 weight percent, preferably equal to or greater than 5 weight percent, preferably equal to or greater than 10 weight percent, more preferably equal to or greater than 20 weight percent, more preferably equal to or greater than 30 weight percent, more preferably equal to or greater than 40 weight percent, more preferably equal to or greater than 50 weight percent, more preferably equal to or greater than 60 weight percent, more preferably equal to or greater than 70 weight percent, more preferably equal to or greater than 80 weight percent, more preferably equal to or greater than 90 weight percent, and most preferably equal to or greater than 95 weight percent based on the combined weight of the mixture of the high and ultra high molecular weight PEOs.

In a preferred embodiment of the present invention, the mixture of high and ultra high molecular weight PEO polymers consists of one or more high molecular weight PEO and one or more ultra high PEO. In other words, the mixture of high and ultra high PEO polymers does not contain any PEO polymers with a molecular weight less than 100,000.

The mixture of polyethylene oxide polymers of the present invention is added directly to the above mentioned suspension of particulate material. The mixture of polyethylene oxide polymers may be in a substantially dry form or preferably added as an aqueous solution. If added as an aqueous solution, the solution preferably contains from 0.3 to 0.5 weight percent of the combined weight of the polyethylene oxide polymers.

The mixture of polyethylene oxide polymers is particularly suitable as flocculation agents for suspensions of particulate material, especially waste mineral slurries. The mixture of polyethylene oxide polymers of the present invention is particularly suitable for the treatment of tailings and other waste material resulting from mineral processing, in particular, processing of oil sands tailings.

Not to be held to any particular theory, we believe the lower viscosity of the mixture of high and ultra high molecular weight PEO polymers of the present invention results in reduced mixing energy, improved mixing when applied to suspensions of particulate material which in turn allows for greater dewatering, and/or faster dewatering times than by using a high and/or an ultra high molecular weight PEO alone.

EXAMPLES

The following polyethylene oxides and MFTs are used in Examples 1 to 36 and Comparative Examples A to X:

"PEO-1" is a high molecular weight polyethylene oxide polymer having a molecular weight of 400,000 g/mol and is available as POLYOX™ WSR N3000 from The Dow Chemical Company;

"PEO-2" is a high molecular weight polyethylene oxide polymer having a molecular weight of 1,000,000 g/mol and is available as POLYOX WSR N12K from The Dow Chemical Company;

"PEO-3" is an ultra high molecular weight polyethylene oxide polymer having a molecular weight of 4,000,000 g/mol and is available as POLYOX WSR 301 from The Dow Chemical Company;

"PEO-4" is an ultra high molecular weight polyethylene oxide polymer having a molecular weight of 8,000,000 g/mol and is available as POLYOX WSR 308 from The Dow Chemical Company;

"PEO-5" is an ultra high molecular weight polyethylene oxide polymer having a molecular weight of 5,000,000 g/mol and is available as POLYOX WSR COAG from The Dow Chemical Company;

"PEO-6" is an ultra high molecular weight polyethylene oxide polymer having a molecular weight of 7,000,000 g/mol and is available as POLYOX WSR 303 from The Dow Chemical Company;

"MFT-1" is obtained from an oil sands operator in Alberta having an average particle size of 10.8 microns, sand:fine ratio is 0.03, and a clay content of 45 wt % having an original solids content of 52 wt % solids and diluted to 30 wt % solids for the following evaluations; and "MFT-2" is obtained from an oil sands operator in Alberta having an average particle size of 10.6 microns, sand:fine ratio is 0.06, and a clay content of 62 wt % having an original solids content of 36 wt % solids and diluted to 30 wt % solids for the following evaluations.

High MW, ultra high MW PEO polymers and mixtures thereof are studied at two different polymer dosage levels. The mixing conditions for mixing the polymer blends with the MFT are either 200 rpm pump speed, 80 second injection time, and 80 second post blend time (Mixing Conditions 1) or 225 rpm pump speed, 40 second injection time, and 80 second post blend time (Mixing Conditions 2).

Dynamic viscosity is determined on a 0.4 wt % solution of the polymer in a mixture of water and isopropyl alcohol in a weight ratio of about 6:1. It is measured as follows: The weight percentage of polymer is based on the weight of water only, i.e., not including the isopropyl alcohol. When preparing the aqueous solutions of the polymers, the isopropyl alcohol is added first in order to allow the polymer particles to completely disperse before water is added. The 0.4 wt % aqueous solution viscosity of the ethylene oxide polymers is determined at 25° C. using a Brookfield DY-II+ digital viscometer. A small sample chamber is used with the S-18 spindle. The speed (rpm) employed to make the measurement is listed in the following data tables. The spindle is immersed in the polymer solution, avoiding entrapping air bubbles, and attached to the viscometer shaft. The height is adjusted to allow the solution level to meet the notch on the spindle. The viscometer motor is activated, and the viscosity reading is taken 5 min after the viscometer motor is started.

Samples for flocculation evaluation are prepared by combining process water and raw tailings in a sample jar based on total solids content of the raw mature fine tailings (MFT) sample. The percent solids in the MFT was determined by drying a sample in an oven to generate a 30 wt % solids content stock sample of MFT in process water. The tailings sample jar is well mixed using an overhead impeller. The tailings sample is continuously mixed while sub-samples are taken for subsequent testing. 95 mL of diluted tailings are added into a flow loop consisting of a set of static mixer (KMS twisted-ribbon) elements and peristaltic pump. The fluid is circulated in a flow loop at a specified pump speed for 30 seconds. Then, a 0.4 wt % solution of the poly (ethylene oxide) polymer or polymer blend in process water is injected via a syringe pump tied into the in-line mixing system over a specified time (injection time). After dosing, fluid recirculation is maintained for a specified time (post-blend time). Samples were then tested by Capillary Suction Time Test (CST) and a Settling Test.

Settling is determined on an 80 mL sample from the mixer loop. The sample is poured into a 100 mL graduated cylinder. The change in solids level versus overall liquid level over time is recorded. After 18 hours, the solids content of the settled tailings from recorded water level and solids level was calculated. The water quality of the separated water layer is determined visually in relation to its clarity with high being most clear and low being less clear and medium in between.

CST is a type of static filtration test for water-based slurries and fluids that measures the filtration rate (for free water) using filter paper as the medium. In this application, it is used to indicate permeability of the flocculated solids slurry. A sample of the flocculant-treated MFT is placed in a cell on top of a strip of filter paper and the release of water is measured as the advancement of the water front on the paper vs. time. A faster rate of water release is indicated by a shorter time for the water front to reach a desired point on the filter paper. CST values are reported in minutes for the advancement of water to reach 15 cm.

Examples 1 to 7 (50:50 mixtures of a high molecular weight PEO and an ultra high molecular weight PEO) and Comparative Examples A and C are evaluated with the 30% solids MFT-1 using Mixing Conditions 1. The dynamic viscosities, settled solids content, and CST results for Examples 1 to 7 and Comparative Examples A and C are listed in Table 1.

TABLE 1

| Com Ex | Ex | PEO-1, % | PEO-2, % | PEO-3, % | PEO-4, % | Dose, ppm | Viscosity, cP | % Solids Initial | % Solids Final | % Change in Solids | CST, min/15 cm |
|---|---|---|---|---|---|---|---|---|---|---|---|
| A |   |   |   |   | 100 | 1000 | 140 | 28 | 32 | 4 | 59.4 |
| C |   |   |   | 100 |   | 1000 | 136 | 28 | 37 | 9 | 26.2 |
|   | 1 | 50 |   |   | 50 | 1000 | 60.7 | 28 | 37 | 9 | 43.1 |
|   | 3 | 50 |   | 50 |   | 1000 | 39.5 | 28 | 44 | 16 | 30.8 |
|   | 5 |   | 50 |   | 50 | 1000 | 51 | 28 | 39 | 11 | 36.3 |
|   | 7 |   | 50 | 50 |   | 1000 | 31 | 28 | 41 | 13 | 32.9 |

For Examples 9 to 14 and Comparative Examples E to H, 75:25 mixtures of a high molecular weight PEO and an ultra high molecular weight PEO are evaluated with the 30% solids MFT-1 using Mixing Conditions 2. The dynamic viscosities, settled solids content, and CST results for Examples 9 to 14 and Comparative Examples E to H are listed in Table 2.

TABLE 2

| Com Ex | Ex | PEO-3, % | PEO-4, % | PEO-5, % | PEO-6, % | Dose, ppm | Viscosity, cP | % Solids Final | CST, min/15 cm |
|---|---|---|---|---|---|---|---|---|---|
| E | | | 100 | | | 1000 | 176 | 39 | 40.5 |
| F | | | 100 | | | 2000 | | 45 | 23.3 |
| G | | 100 | | | | 1000 | 119 | 37 | 26.1 |
| H | | 100 | | | | 2000 | | 43 | 22.8 |
| | 9 | 75 | 25 | | | 1000 | 136 | 40 | 31.1 |
| | 10 | 75 | 25 | | | 2000 | | 45 | 22.4 |
| | 11 | 75 | | 25 | | 1000 | 102 | 41 | 27.6 |
| | 12 | 75 | | 25 | | 2000 | | 43 | 21.0 |
| | 13 | 75 | | | 25 | 1000 | 106 | 40 | 29.5 |
| | 14 | 75 | | | 25 | 2000 | | 44 | 23.2 |

For Examples 15 to 20 and Comparative Examples I to J, 50:50 mixtures of a high molecular weight PEO and an ultra high molecular weight PEO are evaluated with the 30% solids MFT-1 using Mixing Conditions 2. The dynamic viscosities, settled solids content, and CST results for Examples 15 to 20 and Comparative Examples I to J are listed in Table 3.

TABLE 3

| Com Ex | Ex | PEO-3, % | PEO-4, % | PEO-5, % | PEO-6, % | Dose, ppm | Viscosity, cP | % Solids Final | CST, min/15 cm |
|---|---|---|---|---|---|---|---|---|---|
| I | | | 100 | | | 1000 | 187 | 36 | 42.7 |
| J | | | 100 | | | 2000 | | 38 | 25 |
| K | | 100 | | | | 1000 | 131 | 36 | 28 |
| L | | 100 | | | | 2000 | | 37 | 24.1 |
| | 15 | 50 | 50 | | | 1000 | 176 | 36 | 32 |
| | 16 | 50 | 50 | | | 2000 | | 38 | 23.5 |
| | 17 | 50 | | 50 | | 1000 | 136 | 36 | 23.9 |
| | 18 | 50 | | 50 | | 2000 | | 38 | 21.7 |
| | 19 | 50 | | | 50 | 1000 | 136 | 36 | 31 |
| | 20 | 50 | | | 50 | 2000 | | 39 | 21.2 |

For Examples 21 to 28 and Comparative Examples M to R, 75:25 mixtures of a high molecular weight PEO and an ultra high molecular weight PEO are evaluated with the 30% solids MFT-2 using Mixing Conditions 2. The settled solids content, and CST results for Examples 21 to 28 and Comparative Examples M to R are listed in Table 4.

TABLE 4

| Com Ex | Ex | PEO-3, % | PEO-4, % | PEO-5, % | PEO-6, % | Dose, ppm | % Solids Final | CST, min/15 cm |
|---|---|---|---|---|---|---|---|---|
| M | | | 100 | | | 1700 | 37 | 20.8 |
| N | | | 100 | | | 2500 | 40 | 128.5 |
| O | | 100 | | | | 1700 | 37 | 18.9 |
| P | | 100 | | | | 2500 | 40 | 18.3 |
| Q | | | | 100 | | 1700 | 38 | 20.7 |
| R | | | | 100 | | 2500 | 39 | 20.9 |
| | 21 | 75 | 25 | | | 1700 | 38 | 17.8 |
| | 22 | 75 | 25 | | | 2500 | 43 | 18.1 |
| | 23 | 75 | | 25 | | 1700 | 38 | 17.9 |
| | 24 | 75 | | 25 | | 2500 | 40 | 16.7 |
| | 25 | 75 | | | 25 | 1700 | 37 | 17.1 |
| | 26 | 75 | | | 25 | 2500 | 40 | 17.7 |
| | 27 | | 25 | 75 | | 1700 | 37 | 22,.4 |
| | 28 | | 25 | 75 | | 2500 | 43 | 17.3 |

For Examples 29 to 36 and Comparative Examples S to X, 50:50 mixtures of a high molecular weight PEO and an ultra high molecular weight PEO are evaluated with the 30% solids MFT-2 using Mixing Conditions 2. The settled solids content, and CST results for Examples 29 to 36 and Comparative Examples S to X are listed in Table 5.

TABLE 5

| Com Ex | Ex | PEO-3, % | PEO-4, % | PEO-5, % | PEO-6, % | Dose, ppm | % Solids Final | CST, min/15 cm |
|---|---|---|---|---|---|---|---|---|
| S |  |  | 100 |  |  | 1700 | 39 | 19.3 |
| T |  |  | 100 |  |  | 2500 | 39 | 17 |
| U |  | 100 |  |  |  | 1700 | 37 | 17.6 |
| V |  | 100 |  |  |  | 2500 | 37 | 18 |
| W |  |  |  |  |  | 1700 | 38 | 19.3 |
| X |  |  |  |  |  | 2500 | 39 | 21 |
|  | 29 | 50 | 50 |  |  | 1700 | 38 | 17.7 |
|  | 30 | 50 | 50 |  |  | 2500 | 42 | 17.2 |
|  | 31 | 50 |  | 50 |  | 1700 | 38 | 18.4 |
|  | 32 | 50 |  | 50 |  | 2500 | 42 | 16.9 |
|  | 33 | 50 |  |  | 50 | 1700 | 38 | 20.5 |
|  | 34 | 50 |  |  | 50 | 2500 | 42 | 12.3 |
|  | 35 |  | 50 | 50 |  | 1700 | 37 | 19.6 |
|  | 36 |  | 50 | 50 |  | 2500 | 40 | 17.2 |

What is claimed is:

1. A method of dewatering mature fine tailings, the method comprising the steps of:
  a) adding to the mature fine tailings about 1000 ppm of a 50/50 mixture of polyethylene oxide polymers comprising
    (i) one or more high molecular weight polyethylene oxide polymer (PEO) having an average molecular weight of 400,000 g/mol
    and
    (ii) one or more ultra high molecular weight polyethylene oxide polymer (PEO) having an average molecular weight of 8,000,000 g/mol,
    wherein the viscosity of mixture of polyethylene oxide polymers is about 60.7 cP prior to addition to the mature fine tailings;
  b) allowing the mature fine tailings and the mixture of polyethylene oxide polymers to flocculate,
  and
  c) allowing dewatering of the mature fine tailings from step (b) to occur.

* * * * *